United States Patent Office 2,790,493
Patented Apr. 30, 1957

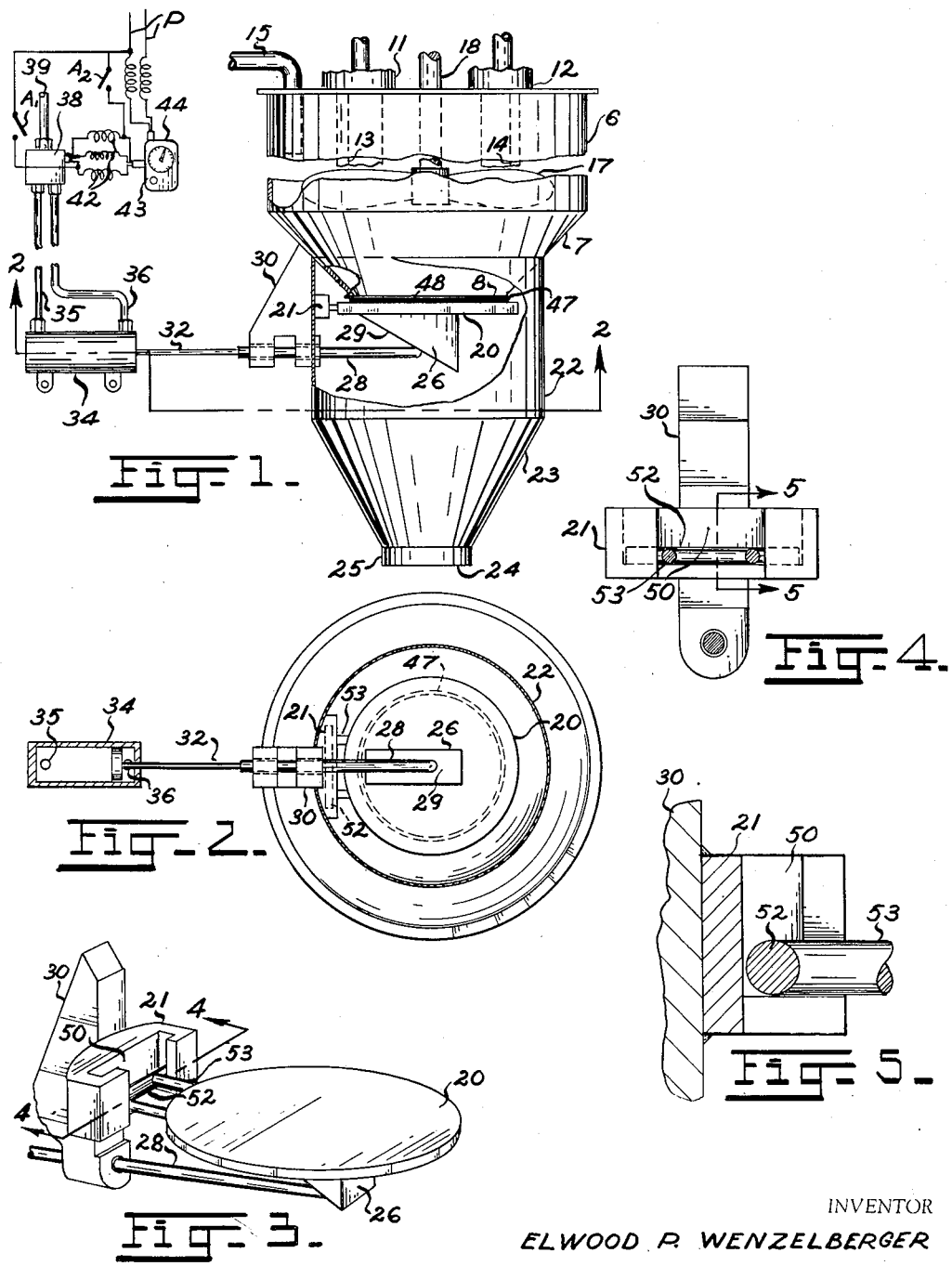

2,790,493

QUICK OPENING MECHANISM FOR TANKS

Elwood P. Wenzelberger, Dayton, Ohio, assignor to The Commonwealth Engineering Company of Ohio, Dayton, Ohio, a corporation of Ohio Application May 13, 1954, Serial No. 429,497

4 Claims. (Cl. 161—7)

This invention relates to an apparatus for use in dehydration equipment for freeze dehydrating heat-sensitive liquid bearing solids, the invention being more particularly concerned with an improved freeze tank mechanism having a quick opening closure therefor to provide rapid and efficient emptying of the freeze tank after the freezing cycle has been completed.

It is an object of the invention to provide a quick opening mechanism for freeze concentration tanks which may be either manually or automatically operated to quickly release the ice slurry liquid from the freezing tank.

Another object of the invention is to provide a closure for the bottom of a freezing tank which is operable for rapid release of the frozen slurry and prevents leakage and spillage of the materials delivered from the tank.

Another object of the invention is to provide a quick opening mechanism for installation at the bottom of freeze dehydration tanks of this character to provide an improved closure which is sealed against leakage but which can be quickly operated to release all of the contents in the tank in the shortest period of time, said closure mechanism being automatically adjustable to conform with the opening at the bottom of the tank and prevent leakage of the tank during the freezing cycle.

It is a further object of the invention to provide mechanism for dumping the contents of a freezing tank automatically at the end of a predetermined freezing cycle so that the entire contents of the tank containing ice particles which tend to cling together, causing the same to be dispersed and released from the mother liquid.

The invention is particularly useful to provide automatic or push button control of the emptying of the freeze tanks during freeze dehydration of liquid containing solids such as citrus and fruit juices which are to be dehydrated by freezing. In this process, a juice to be dehydrated is conveyed to a tank containing tubes for receiving refrigerant and the freezing period is allowed in order to produce a crop of pure ice crystals, the cycle being limited to a time sufficient for the freezing point of a solution to be lowered to approximately the temperature in the tank, which temperature is just sufficient to cause the formation of ice crystals throughout the liquid. During the freezing treatment the juice or liquid being refrigerated is thoroughly agitated and the ice crystals formed are kept dispersed throughout the liquid.

In accordance with the freeze dehydration process the temperatures are carefully controlled and progressively lowered at each successive stage of freezing cycles. For example, it has been found that in order to prevent the ice crystals formed during the freezing from occluding substantial amounts of the solution or juice being treated, it is necessary to keep the juice thoroughly stirred and to maintain a small differential of temperature between the refrigerant and the juice. It has been found in this connection that the successive stages of freezing treatment should be held to small differential temperature such as about 5–7° F. and that the temperature of the liquid or juice being treated in the second stage and subsequent stages should be approximately the temperature of the refrigerant in the succeeding stage, and so on. These differentials in temperature will, of course, vary somewhat with the material being treated, but the principle of the operation remains the same.

In order to obtain fine ice crystals in a relatively pure form without occluding substantial amounts of the solids, the temperature of the cooling liquid is kept practically constant, the temperature being maintained at a predetermined lower temperature in each stage of freezing and just below the ice forming temperature of the solution.

In the freeze dehydration system utilizing the tanks as described, it has been found important to provide for rapid and quick discharge or emptying of the freeze tank. If the slurry of partially frozen liquid is not quickly discharged from the freeze tank there is a tendency for the ice particles to coalesce and block the operation. This not only disrupts the process but is economically disadvantageous because of the loss of time in the use of the freezing tank. Further, the quick opening freeze tank in cooperation with the stirrer functions to prevent or overcome any coalescing or sticking together of the ice particles during operation of the freeze dehydration tank.

The further advantages and improvements will be apparent from the following description taken in connection with the drawing wherein—

Figure 1 is an elevational view of a freezing tank for use in freeze dehydrating liquids containing solids such as fruit and vegetable juices, in accordance with this invention, the tank being equipped with quick opening closure embodying this invention, the parts being shown broken away and partly in section to better illustrate the construction and operation thereof;

Figure 2 is a view taken substantially on the line 2—2 and looking upward from beneath the tank, as shown by the arrows in Figure 1;

Figure 3 is a perspective view of the closure mechanism shown in Figure 1, and showing the closure in position to close the bottom of the freezing tank;

Figure 4 is a fragmentary view, partly in section, taken substantially on the line 4—4 of Figure 3 and looking in the direction of the arrows;

Figure 5 is a similar fragmentary sectional view taken on the line 5—5 of Figure 4, looking in the direction of the arrows.

Referring to the drawing in greater detail, the reference character 6 designates a freezing tank having a frusto-conically shaped bottom portion 7 which terminates in an opening 8 in the bottom of the tank. In order to provide an opening sufficiently large to permit rapid discharge of the contents of the tank, the diameter of the opening is preferably made not less than one-half the diameter of the tank 6. The freezing tank 6 is preferably constructed and operated as in my copending application, Serial No. 196,686, filed November 8, 1950, now Patent No. 2,723,539, granted November 15, 1955, for Method and Apparatus for Dehydration of Liquids by Freezing.

The freezing tank comprises one or more refrigerant containing tubes such as shown diagrammatically at 11 and 12, which are equipped with scraper means 13 and 14 respectively. The refrigerant is suitably admitted to the freezing tubes 13 and 14 to effect refrigeration of the liquid bearing solids to be freeze dehydrated such as aforementioned.

The juice is introduced into the freezing tank through a pipe 15 which is connected to a source of juice storage. A propeller type stirrer 17 is arranged in the freezing tank and operates to keep the mixture being refrigerated thoroughly stirred and assists in the propulsion of the icy slurry mass through the discharge opening 8 at the end of the freezing cycle.

The opening 8 at the bottom of the tank is closed by the quick opening cover 20 which functions as a swinging door which is swung upwardly and adjustably against the opening 8 to seal the opening. The cover or door member 20 is hinged as at 21 and supported on the wall of the cylindrical canopy 22 arranged about the opening 8, the canopy being of a diameter substantially greater than the opening and sufficient to contain the swinging door 20. The cylindrical canopy 22 terminates in a lower funnel-shaped portion 23 and discharge opening 24, the latter being provided with a collar 25 for attachment to a conduit, not shown, whereby the material discharged from the freezing tank may be conducted to a centrifuge for further processing.

In order to provide for quick opening of the door 20 and vertical adjustment of the same against the opening 8, there is provided a wedge-shaped member 26 arranged on the underside of the door 20, which provides a sliding guide member for a push rod 28. The wedge member 26 has a sloping surface 29 which slopes at approximately a 30 degree angle to the longitudinal axis of the rod 28. The push rod 28 is suitably supported by a bracket member 30 attached at the outside wall of the canopy 22, as shown in Figure 1.

For operating the push rod the same is secured to an elongated rod 32 which is arranged to be actuated by a piston air cylinder 34. Air fluid pressure is admitted to the opposite ends of the air cylinder 34 through the conduits 35 and 36, the fluid pressure being suitably admitted to either of the conduits 35 and 36 through the electro air control box 38 which is connected to a fluid pressure source through the line 39, as shown in Figure 1.

To provide for quick actuation and opening of the door 20, the double acting piston air cylinder 34 is connected with the air or fluid pressure line 39, as illustrated in Figures 1 and 2. Operation of the air cylinder 34 is preferably automatic but provision is made for manual operation if desired. Suitable timing mechanism such as shown at 43 is provided so that the push rod 28 will be automatically actuated, for instance, withdrawn to the left to open the tank and returned to the right to close the tank, as shown in Figure 1. The over-all time cycle of this operation may be varied by changing the setting on the dial 44 of the timing mechanism 43 whereby the electrical contact switch connection is made at the desired time to bring about actuation of the air cylinder 34.

Although other suitable means may be provided to actuate the swinging door 20, e. g. by manual operation, the use of an automatic timer for controlling both on and off or open and closed door operations is preferred because it is much more positive and time saving. Automatic timer operation also effects the greatest precision and efficiency of the freeze dehydration system. The timer can be set for the desired delay operation between opening and closing, thus giving a chance for the tank to drain.

In the timer and control switch mechanism illustrated in Figure 1, the timer 44 is connected to the power line P and to the electro air control box 38. Switches A₁ and A₂ are provided for over-riding the automatic timer 44 when it is desired to operate the piston to open and close the lid 20 manually.

To provide a pneumatically sealed closure for the door 20, a gasket member 47 is positioned in the lower end flange portion 48 about the opening 8 of the tank 6.

To provide for adjustment of the door vertically against the gasket member 47, the hinge block 21, as shown in Figure 3, is provided with a T-shaped opening 50 in which is slidably supported the hinge rod member 52 which in turn is rigidly connected to the door 20 by the arm members 53. By providing such structure, it will be seen that upon movement of the push rod 28 to the right, as shown in Figure 1, the same will be guided upwardly along the inclined surface 29 of the wedge cam member 26 and the door 20 brought in contact with the gasket 47. Upon further pressure from the rod 28, the door member 20 adjusts upwardly and moves the hinge member 52 vertically in the T-slot 50 of the hinge block 21.

In this manner the door is made self-adjustable to fit closely against the gasket 47 and seal the opening of the tank so that the material will not leak or spill out during operation of the freezing cycle.

A quick opening door for releasing the slurry mass from the freezing tank is thus provided and when made of suitable material such as plywood, metal, or the like, is capable of sustaining a load of approximately 175 pounds in the case of a 100 gallon tank. Under such a load the cover would be subjected to 130 lbs. pressure in the case of orange juice for example, and a 10-inch diameter closure for a tank of 4-foot depth provides a pressure of less than 2 pounds per square inch on the cover. This load is readily sustained by the cover. A lightweight cover may be made of aluminum or fabricated from magnesia or an alloy thereof. Where corrosion is a problem, the cover may be constructed of stainless steel.

In accordance with the invention there is provided a quick opening closure for the refrigerating tanks so that the frozen slurry mass can be practically instantaneously discharged from the tank, the gravitational force of the mass in the tank being sufficient to disintegrate any particles of ice crystals which may cling together. If desired fluid pressure may be admitted to the tank to blow the material out, however, this is generally not necessary due to the utilization of the propeller 17 which blades assist in discharging the fluid in the tank so as to produce the desired results.

It will be understood that the invention may be varied in the details of structure and that substitution of parts may be made by those skilled in the art without departing from the spirit and scope of the invention, and as more fully set forth in the appended claims.

What is claimed is:

1. A quick opening closure mechanism for freeze dehydrating tanks having an opening through which a slurry mass of ice crystals is discharged, said mechanism comprising a door supported for swinging movement to and from said opening, said door being shaped to fit over said opening and close the same, a hinge block for hingedly supporting said door, a T-shaped slot in said hinge block for receiving a hinge portion attached to said door and retained in said block for pivotal movement of the door about said hinge block, means comprising a triangular-shaped guide member disposed on the under side of said door, a reciprocable rod for engaging said guide member to cause said door to swing about said hinge block, said door hinge portion being movable vertically in said T-slot to permit lateral movement of the door as a unit towards and away from said opening.

2. A quick opening closure mechanism for freeze dehydration tanks having an opening through which a slurry mass of ice crystals is discharged, said mechanism comprising a door supported for swinging movement to and from said opening, said door shaped to fit over said opening and close the same, a hinge portion on said door, a member for supporting said hinge portion in position to be swung to and from said opening, a slot extending laterally and vertically in said member, whereby said door is movable vertically in said slot as a unit relative to said member to permit said door to engage and fit snugly against said opening, a triangular-shaped guide member attached to said door, a reciprocable rod for engaging said guide member and said door to cause the same to swing about its hinge portion, piston operated means for reciprocating said rod, and means comprising an electrical timer adjustable for causing the actuation of said rod after a predetermined time to operate said door.

3. A quick opening closure mechanism for freeze dehydration tanks having an opening through which a slurry mass of ice crystals is discharged, said mechanism comprising a door supported for swinging movement to and from said opening, said door shaped to fit over said opening and close the same, a hinge portion on said door, a member for supporting said hinge portion in position to be swung to and from said opening, a slot extending laterally and vertically in said member whereby said door is movable vertically in said slot as a unit relative to said member to permit said door to engage and fit snugly against said opening, a triangular-shaped guide member attached to said door, a reciprocable rod for engaging said guide member and said door to cause the same to swing about its hinge portion to quickly release said door for opening and returning said door to its closed position.

4. A quick opening closure mechanism for freeze dehydration tanks having an opening through which a slurry mass of ice crystals is discharged, said mechanism comprising a door supported for swinging movement to and from said opening, said door shaped to fit over said opening and close the same, a hinge portion on said door, a member for supporting said hinge portion in position to be swung to and from said opening, a slot extending laterally and vertically in said member, whereby said door is movable vertically in said slot as a unit relative to said member to permit said door to engage and fit snugly against said opening, a cam member attached to said door, a reciprocable rod for engaging said cam member and causing said door to swing about its hinge portion to a closed position, means comprising a piston actuated by fluid pressure for reciprocating said rod, and means comprising an electrical timer adjustable for causing the actuation of said rod after a predetermined time to operate said door.

References Cited in the file of this patent

UNITED STATES PATENTS

| 633,207 | Miles | Sept. 19, 1899 |
| 1,694,369 | Burdick | Dec. 11, 1928 |
| 2,217,283 | Lorrin | Oct. 8, 1940 |
| 2,448,802 | Holzker | Sept. 7, 1948 |
| 2,563,093 | Bayston | Aug. 7, 1951 |
| 2,583,294 | Erickson et al. | Jan. 22, 1952 |
| 2,601,566 | Soderquist | June 24, 1952 |
| 2,639,144 | Long | May 19, 1953 |

FOREIGN PATENTS

| 387,460 | France | July 10, 1908 |